US008250590B2

(12) United States Patent
Katari et al.

(10) Patent No.: US 8,250,590 B2
(45) Date of Patent: Aug. 21, 2012

(54) APPARATUS, SYSTEM, AND METHOD FOR SEAMLESS MULTIPLE FORMAT METADATA ABSTRACTION

(75) Inventors: Madhavi Katari, Sunnyvale, CA (US); Travis E. Nelson, San Jose, CA (US); Suraksha Vidyarthi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1026 days.

(21) Appl. No.: 11/777,744

(22) Filed: Jul. 13, 2007

(65) Prior Publication Data
US 2009/0019458 A1 Jan. 15, 2009

(51) Int. Cl.
*G06F 3/00* (2006.01)

(52) U.S. Cl. ....................................................... 719/328

(58) Field of Classification Search .................. None
See application file for complete search history.

(56) References Cited

U.S. PATENT DOCUMENTS

| | | | | |
|---|---|---|---|---|
| 6,119,118 A * | 9/2000 | Kain et al. | ..................... | 707/822 |
| 6,173,311 B1 * | 1/2001 | Hassett et al. | ................. | 709/202 |
| 6,453,356 B1 * | 9/2002 | Sheard et al. | .................. | 709/231 |
| 6,542,967 B1 * | 4/2003 | Major | ............................ | 711/134 |
| 6,862,729 B1 * | 3/2005 | Kuch et al. | ..................... | 717/158 |
| 7,152,090 B2 | 12/2006 | Amirisetty et al. | ........... | 709/200 |
| 7,506,303 B2 * | 3/2009 | Gupta et al. | ................... | 717/104 |
| 2002/0120787 A1 * | 8/2002 | Shapiro et al. | ................. | 709/311 |
| 2003/0037174 A1 * | 2/2003 | Lavin et al. | ..................... | 709/313 |
| 2003/0093470 A1 | 5/2003 | Upton | ........................... | 709/203 |
| 2004/0078495 A1 | 4/2004 | Mousseau et al. | ................. | 710/1 |
| 2005/0033726 A1 * | 2/2005 | Wu et al. | ............................ | 707/1 |
| 2005/0065952 A1 * | 3/2005 | Dettinger et al. | ............. | 707/101 |
| 2006/0122961 A1 | 6/2006 | Kalia et al. | ......................... | 707/1 |

OTHER PUBLICATIONS

Portier et al., "Introduction to Service Data Objects", http://www-128.ibm.com/developerworks/java/library/j-sdo/, Sep. 28, 2004.
Moore et al. "Managing Information Access to an Enterprise Information System: Using J2EE and Services Oriented Architecture," Redbooks, http://www.redbooks.ibm.com/redbooks/pdfs/sg246371.pdf Jan. 2005.
IBM WebShare Adapters V6.0.2, "WebSphere Adapter for JD Edwards EnterprisesOne V6.0.2", http://publib.boulder.ibm.com/infocente/ieduasst/v1r1m0/index.jsp?topic=/com.ibm.iea.wpi_v6/6.0.2/JDE/WPIv602_AdapterJDE/player.html Mar. 2007.

* cited by examiner

*Primary Examiner* — S. Sough
*Assistant Examiner* — Carina Yun
(74) *Attorney, Agent, or Firm* — Kunzler Needham Massey & Thorpe (57) ABSTRACT

An apparatus, system, and method are disclosed for providing seamless multiple format metadata abstraction. A metadata application programming interface (API) is provided to abstract metadata from an incoming business object and provide it to an adapter for processing. The metadata API is configured to operate on multiple metadata formats such as SDO and JavaBean such that the adapter receives the metadata from the metadata API in a common format that is compatible with the adapter. In this manner, the multiple metadata formats may be plugably used with the adapter.

21 Claims, 4 Drawing Sheets

APPARATUS, SYSTEM, AND METHOD FOR SEAMLESS MULTIPLE FORMAT METADATA ABSTRACTION

BACKGROUND OF THE INVENTION

1. Field of the Invention

This invention relates to adapters for use with an enterprise information system (EIS) and more particularly relates to abstracting metadata of various different formats into a common format for use by an EIS.

2. Description of the Related Art

Adapters allow business events to flow from an enterprise information system (EIS) to a listening client such as a business process or other application. The Java 2 Enterprise Edition (J2EE) standard defines a standard approach to building these adapters as outlined in the J2EE connector architecture (JCA) specification.

Advanced implementations of adapters are metadata-driven. This implies that the adapter is not hard-coded for each object type in the system, but rather has a form of discovery in which a representation of the object (metadata) in the EIS is constructed at build time such that at runtime the adapter uses this metadata, along with the object data, to process the object. In most implementations, metadata is in a pre-existing format, such as a standardized EIS schema. Standardized metadata includes such information as property name, property type, maximum length, cardinality, and anything else that can be described in a standard schema. Metadata may also be in a format defined by the adapter. This form of metadata is called Application Specific Information, or ASI.

ASI can typically occur in three forms: object level metadata; operation level metadata; and property level metadata. Object level metadata includes the information about what type is being processed. Operation level metadata is context-specific object metadata that is valid for the operation being processed at the present time. Property level metadata is information about a particular property in an EIS schema such as a column name as it occurs in the EIS which may be different than the property name in the object. Generally, this ASI data is structured such that it may be described as a Map (table), or Map of Maps (tree).

Conventional adapters may also have the capability to handle data in multiple end formats depending on the runtime system they are running in. This is accomplished via a Data Exchange API. In some embodiments, the Data Exchange API allows the adapter to interact with data, such as by reading or writing a particular value, through a set of interfaces known as a Data Exchange Service Provider Interface (DE-SPI). These interfaces are implemented by the runtime in which the adapter is running in order to allow the adapter to deal with the runtime's data format instead of the runtime having to convert the adapter's data format to its own. For instance, if a J2EE application deals with data in the JavaBean format, a Data Exchange implementation for JavaBean will read and write to the bean on behalf of the adapter. The same is true for other data formats such as Service Data Ojects (SDO). In effect, the DESPI makes the incoming data format received by the adapter "pluggable".

However, even though conventional technologies such as a DESPI allow the handling of multiple data formats, such technologies do not address how to "plug-in" multiple different formats for metadata. For example, an adapter is typically concerned with certain metadata information or ASI such as type information, facets such as "maximum length", cardinality of children, and annotations. In conventional systems ASI is used to drive the adapter which means that the specific adapter code is embedded with and depends on the ASI. Therefore, in order to support more than one metadata format, it is critical to provide an abstraction of pertinent metadata information from incoming objects into a form compatible with the adapter code. Thus, by providing an interface for abstracting pertinent metadata from a variety of different metadata formats, it becomes possible to overcome some or all of the current needs in the art.

SUMMARY OF THE INVENTION

From the foregoing discussion, it should be apparent that a need exists for an apparatus, system, and method that seamlessly abstracts metadata in multiple formats. Beneficially, such an apparatus, system, and method would overcome the current need in the art of providing an adapter that can handle multiple different pluggable metadata formats.

The present invention has been developed in response to the present state of the art, and in particular, in response to the problems and needs in the art that have not yet been fully solved by currently available adapters. Accordingly, the present invention has been developed to provide an apparatus, system, and method for seamless multiple format metadata abstraction that overcome many or all of the above-discussed shortcomings in the art.

The apparatus to provide seamless multiple format metadata abstraction is provided with an adapter in electronic communication with an enterprise information system (EIS) and in electronic communication with a client. The adapter comprises a metadata application programming interface (API) configured to abstract and provide metadata information to the adapter for processing. The metadata API is configured to operate on two or more different metadata formats and the metadata API comprises a plurality of modules. These modules in the described embodiments include an abstraction module, a communication module, and a cache module.

The abstraction module is configured to abstract metadata related to an incoming object and the abstraction module is further configured to operate on two or more different metadata formats. In one embodiment, the abstraction module is configured to register and instantiate a type class and a property class for two or more different metadata formats. The type class is configured to convert type metadata from the original metadata format to the common metadata format and the property class is configured to convert property metadata from the original metadata format to the common metadata format in accordance with the metadata API.

In a further embodiment, the abstraction module may comprise a type module, the type module configured to provide a type interface for seamlessly retrieving object-level metadata in a common format regardless of the original format of the metadata. In yet a further embodiment, the abstraction module may comprise a property module, the property module configured to provide a property interface for seamlessly retrieving property-level metadata in a common format regardless of the original format of the metadata.

The communication module is configured to communicate abstracted metadata to the adapter in a common format such that the adapter processes the abstracted metadata information without regard to an original format of the metadata.

The cache module, in one embodiment, is configured to store and retrieve abstracted metadata for a particular business object type in a cache. In a further embodiment, the cache may have a predefined maximum size limit and a counter for counting the number of times each particular business object type is referenced within the cache. In various embodiments, the cache discards a least frequently used business object type stored in the cache based on the number of times each particular business object type has been referenced in the cache and in response to caching a new business object type that causes the cache to exceed the predefined maximum size limit.

In a further embodiment, the two or more different metadata formats may comprise Service Data Object (SDO) format and Java Bean format. In yet a further embodiment, the two or more different metadata formats further comprise an application specific metadata representation format.

In at least one embodiment, a computer program product is provided comprising a tangible computer readable medium having computer usable program code executable to perform operations to provide seamless multiple format metadata abstraction by an adapter in communication with an enterprise information system (EIS). The computer programmed product is configured to provide substantially the same metadata API, modules, and various embodiments as described above with regard to the apparatus.

A system of the present invention is also presented to provide seamless multiple format metadata abstraction. In particular, the system, in one embodiment, includes an enterprise information system (EIS) comprising a processor and a memory, a client comprising a processor and a memory, and an adapter in electronic communication with the EIS and in electronic communication with the client. The adapter comprises a metadata application programming interface (API) configured to abstract and provide metadata information to the adapter for processing wherein the metadata API is configured to operate on two or more different metadata formats. In various embodiments, the metadata API substantially includes the modules and embodiments described above with regard to the apparatus.

A method of the present invention is also presented to provide seamless multiple format metadata abstraction. The method in the disclosed embodiments substantially includes the steps necessary to carry out the functions presented above with respect to the operation of the described apparatus and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a computer readable storage medium and/or a transmission medium. The transmission medium may be embodied by a transmission line. The computer readable storage medium may be embodied in a compact disk, a digital-video disk, a magnetic tape, a Bernoulli drive, a magnetic disk, a punch card, flash memory, integrated circuits, and/or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
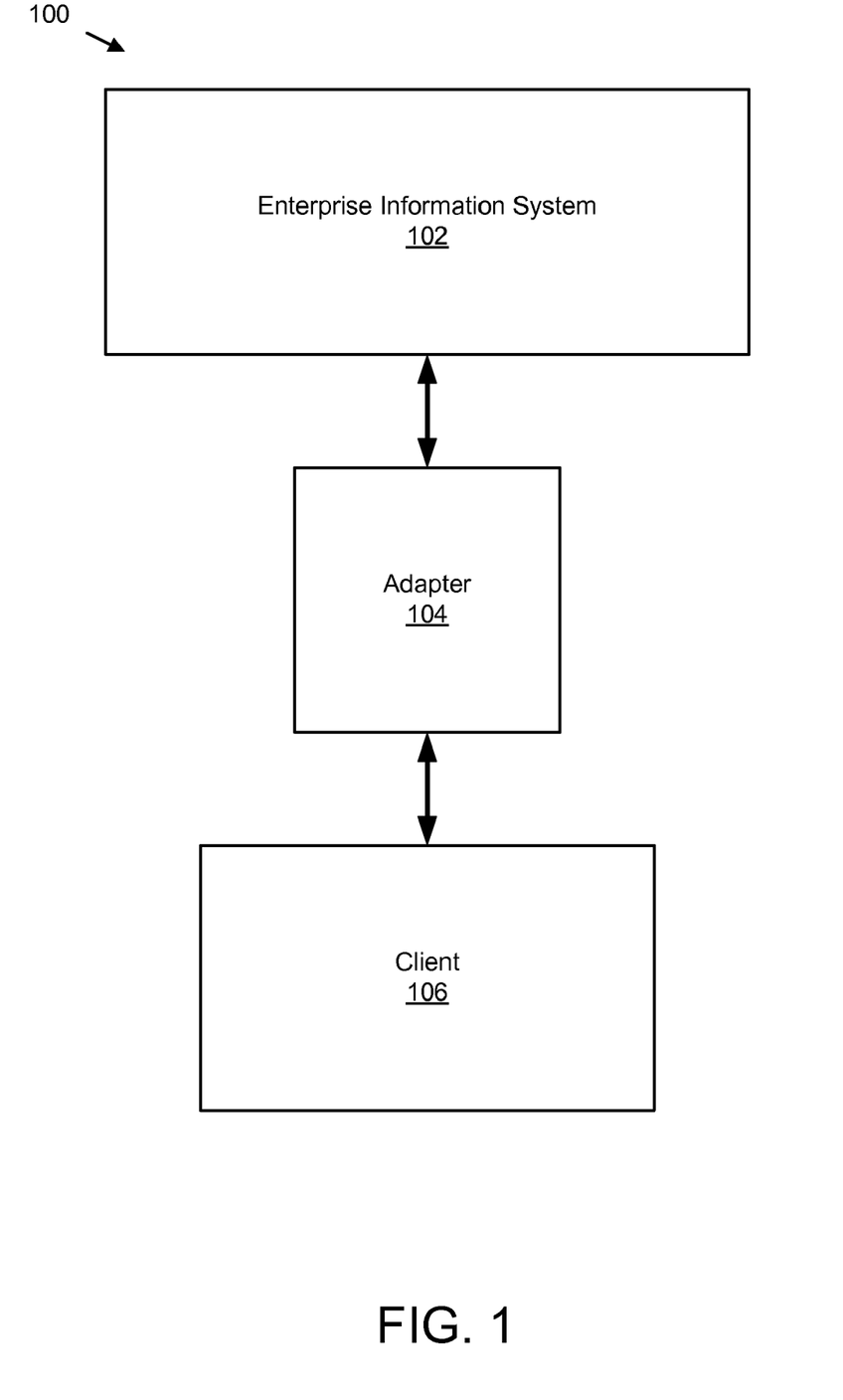
FIG. 1 is a schematic block diagram illustrating one embodiment of a system to provide seamless multiple format metadata abstraction in accordance with the present invention.

FIG. 1 is a schematic block diagram illustrating one embodiment of a system 100 to provide seamless multiple format metadata abstraction in accordance with the present invention. In one embodiment, the system 100 includes an Enterprise Information System (EIS) 102, an adapter 104, and a client 106. Of course, as will be recognized by one of skill in the art, numerous configurations of the system 100 are possible which, in various embodiments, may include additional clients 106, networks, servers, and databases.

The EIS 102 is generally any kind of computing system that is of "enterprise class" which typically means a system with high quality of service that is capable of dealing with large volumes of data and capable of supporting some large organization or enterprise. EISs 102 are particularly useful in eliminating the problem of information fragmentation caused by multiple information systems in an organization by creating a standard data structure. In one embodiment, the EIS 102 provides a technology platform that enables an organization to integrate and coordinate its business processes. Preferably, the EIS 102 is a single system that is central to an organization to ensure that information can be shared across all functional levels and management hierarchies; however, other configurations are possible as well as will be recognized by one of skill in the art.

In one embodiment, the EIS 102 may be housed in one or more data centers and typically runs enterprise software which may include applications such as content management systems. Preferably, the enterprise software is application software that performs common business functions such as accounting, production scheduling, customer information management, bank account maintenance, etc. The enterprise software, in one embodiment, is hosted on one or more servers and simultaneously provides service to a large number of users, typically over a computer network.

The EIS 102 is in electronic communication with the adapter 104. The adapter 104 is provided between the EIS 102 and other system components such as client 106 in order to provide a standard system-level pluggability between the EIS 102 and the client 106. The adapter 104 is preferably a system-level software driver used by the client 106 to connect to the EIS 102 in order to obtain the proper underlying mechanisms, transactions, security, and connection pooling mechanisms necessary to provide seamless communication with the EIS 102. The Java 2 Enterprise Edition (J2EE) provided by Sun Microsystems of Santa Clara, Calif. defines a standard approach to building the adapter 104 as outlined in the J2EE Connector Architecture (JCA) specification. In one embodiment, the adapter 104 is based on the JCA architecture and is a WebSphere adapter available from IBM of Armonk, N.Y.

The adapter 104 is in electronic communication with at least one client 106. The client 106 may be any type of device or application that accesses the EIS 102. Examples of the client 106 include an application server, an application client, a personal computer, a PDA, a laptop, or some other networking device or application.

Figure 2:
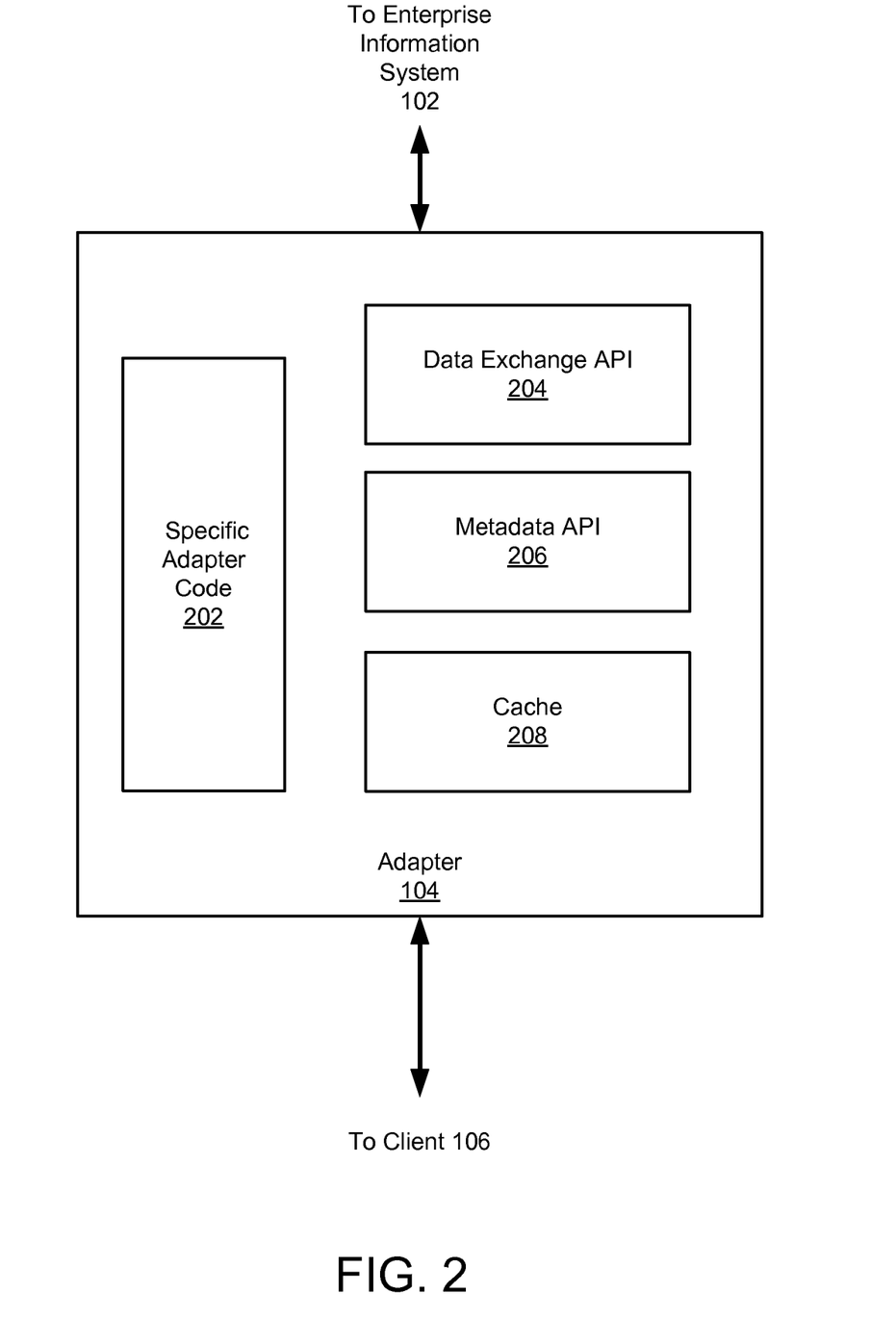
FIG. 2 is a schematic block diagram illustrating one embodiment of an adapter in accordance with the present invention.

FIG. 2 is a schematic block diagram illustrating one embodiment of an adapter 104 in accordance with the present invention. The adapter 104, in one embodiment, includes a specific adapter code 202, a Data Exchange API 204, a Metadata API 206, and a cache 208.

The specific adapter code 202 is the code that defines the functionality of the adapter 104. In one embodiment, the specific adapter code 202 is configured to drive the adapter 104 based on the metadata of incoming data objects. In particular, the specific adapter code 202 drives the adapter based on application specific information (ASI) such as type information, facets such as "maximum length", cardinality of children, and annotations. For example, ASI in business object definitions provides the adapter 104 with application-dependent instructions on how to process that particular business object. In one embodiment, the adapter 104 parses the ASI from the attributes or verb of a business object or from the business object itself to generate queries for create, update, retrieve, and delete operations.

Because the specific adapter code 202 relies on the ASI to drive the adapter 104, the specific adapter code 202 may include numerous references to the ASI throughout the code. Therefore, in order to plugably handle multiple metadata formats, the ASI must be provided in a standard format compatible with the specific adapter code 202. The Metadata API 206 discussed below abstracts metadata (ASI) received in non-standard format into the standard format as defined by the specific adapter code 202 such that metadata from two or more different data formats may be utilized without substantially changing the specific adapter code 202.

The Data Exchange API 204 is a set of interfaces that allows data structured under a source schema to be transformed into a target schema so that the resulting target data is an accurate representation of the original source data. In one embodiment, the Data Exchange API 204 provides the functionality for the adapter 104 to plugably handle a variety of different data object formats. For example, if a J2EE application utilizes data in the JavaBean format, a Data Exchange implementation for JavaBean will read and write to the bean on behalf of the adapter. The same is true for other data formats such as SDO. In this manner, the incoming data formats are essentially pluggable with the adapter 104. A Data Exchange API 204 that provides plugability is typically referred as a Data Exchange Smart Plug-in (DESPI). Therefore, the Data Exchange API 204 allows the plugability of different data formats, whereas the Metadata API 206 allows the plugability of different metadata formats.

In one embodiment, a cache 208 is provided with the adapter 104. The cache 208 is provided to store and quickly retrieve metadata information. The lookup and reading of metadata in some data formats such as SDO can be very expensive. Therefore, the cache 208 is provided to allow the caching of metadata of any incoming format in a generic manner for quick retrieval and use by the adapter 104. In this manner, the expensive cost associated with the repeated lookup of commonly used metadata information can be avoided.

Figure 3:
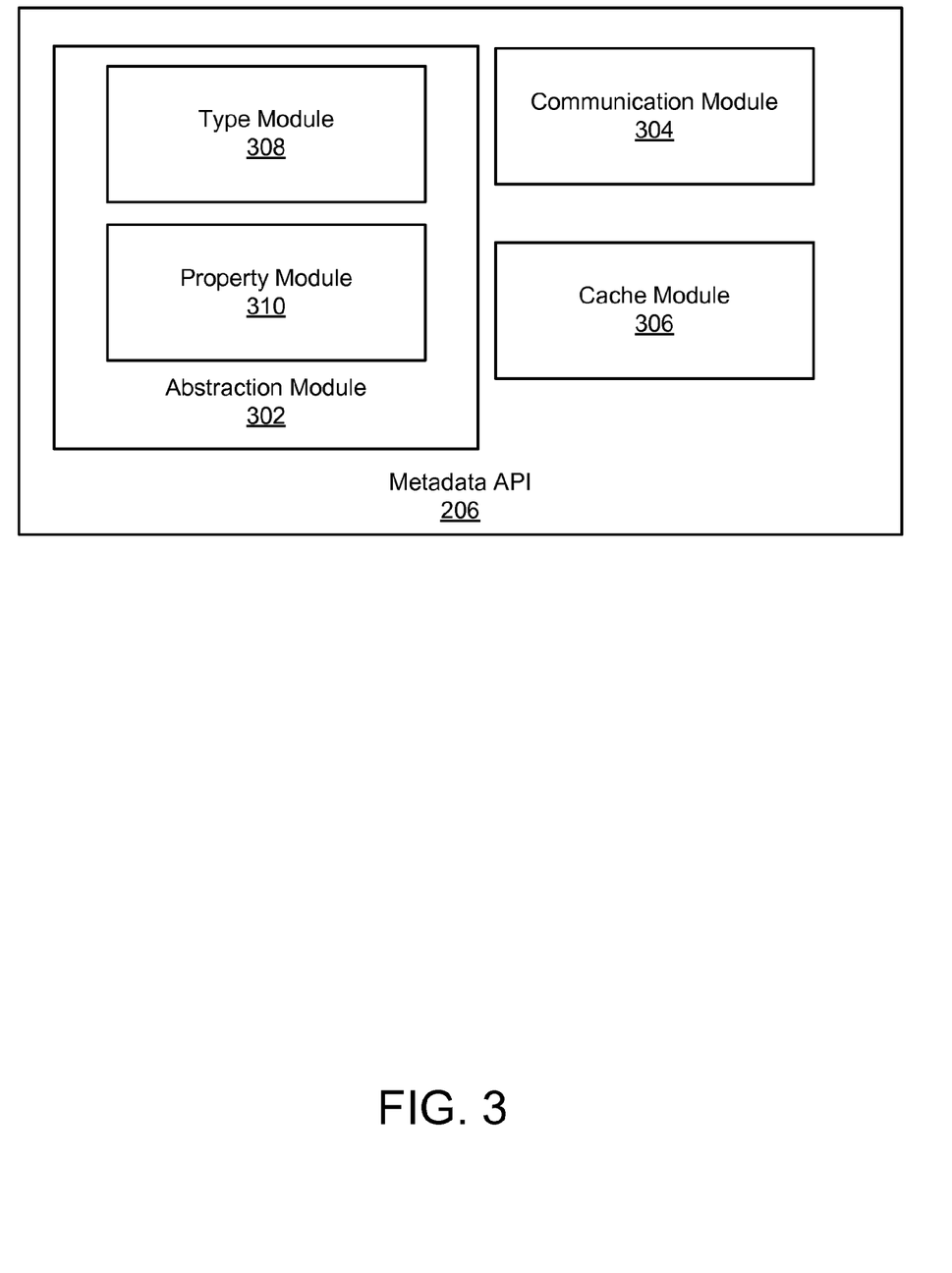
FIG. 3 is a schematic block diagram illustrating one embodiment of a metadata application programming interface (API) in accordance with the present invention.

FIG. 3 is a schematic block diagram illustrating one embodiment of a Metadata API 206 in accordance with the present invention. The Metadata API 206 includes an abstraction module 302, a communication module 304, and a cache module 306. In one embodiment, the abstraction module includes a type module 308 and a property module 310. The Metadata API 206 operates similarly to the Data Exchange API 204 in that it provides pluggability for two or more data formats. However, the Metadata API 206 operates on metadata rather than the data itself. Thus, if the adapter 104 receives a business object from the client 106, the adapter 104 will utilize the Metadata API 206 to process the metadata associated with the business object such that the adapter 104 is insulated from the original metadata format. For example, when the adapter 104 needs structural information about an object it is processing, such as the type of a property, the size of a property, or ASI, it will utilize the Metadata API 206. The Metadata API 206 allows applications to represent any native data representation through a common metadata interface. The underlying data that holds metadata may be in any format such as SDO, JavaBean, or an application specific representation.

In one embodiment, the Metadata API 206 is configured to abstract and provide metadata information related to a business object to the adapter 104 for processing. In a further embodiment, the Metadata API 206 is configured to operate on two or more different metadata formats such as JavaBean and SDO such that the adapter 104 seamlessly processes the metadata in accordance with the specific adapter code 202. In one embodiment, the Metadata API 206 is preferably implemented by the runtime where the adapter 104 is running such that the Metadata API 206 and its associated modules operate with seamless pluggabililty.

In one embodiment, the abstraction module 302 is configured to abstract pertinent metadata information related to an incoming business object. As used in accordance with this invention, to abstract means to obtain particular and relevant metadata information, such as ASI, related to an incoming object regardless of the format of the incoming metadata, and such that the metadata information can be provided to the adapter in a common format.

For example, in one embodiment, the abstraction module 302 is configured to register and instantiate a 'type class' and a 'property class' for two or more different metadata formats such that the 'type class' is configured to convert type metadata from the original metadata format to a common metadata format and the 'property class' is configured to convert property metadata from the original metadata format to a common metadata format. Thus, if metadata related to an incoming business object is received in a format such as SDO or JavaBean, the abstraction module 302 may utilize the 'type class' and 'property class' to convert the incoming metadata to the common format defined by the adapter 104 so that the adapter 104 is insulated from the original metadata format.

In one embodiment, a type module 308 may be provided to provide a type interface for seamlessly retrieving object-level metadata in a common format regardless of the original format of the metadata. The type module 308 provides access to object-level metadata such as type name, property iterations, property lists, property objects, annotations, operation-specific object metadata, key properties, etc. A property module 310 may also be provided to provide a property interface for seamlessly retrieving property-level metadata in a common format regardless of the original format of the metadata. Property-level metadata may include information such as property containing type, default property value, property name, property class, property containment (whether or not the property contains a particular type), max length of the property, annotations for the property, property key information (whether or not the property is a key), etc. In this manner, the Metadata API 206 allows the adapter 104 to utilize the type interface and property interface to obtain metadata information within adapter runtime environment and without regard to the original format of the metadata.

The implementation of different metadata formats within the Metadata API 206 may require some format specific interfacing. For example, if SDO is used, the Metadata API 206 will simply pass through type and property calls to the type and property interfaces described above. However, if JavaBean is used, then some metadata such as "containedType" and "maxLength" which are not normal parts of the JavaBean structure, may be implemented as part of an annotation map. Annotations are not normally part of a Java Bean structure, but JavaBeans may be configured to contain annotations in a specific format that is usable by the Metadata API 206. Furthermore, JavaBean APIs typically cannot detect the order of properties present in a class file. Thus, in one embodiment, the JavaBean may be configured to include a string array called "propertyOrder" containing the names of all properties in the desired order. In this manner, a format such as JavaBean becomes plugable with the Metadata API 206.

The communication module 304 is configured to communicate abstracted metadata to the adapter 104 in a common format such that the adapter 104 processes the abstracted metadata information without regard to an original format of the metadata. Thus, the communication module 304, in one embodiment, provides the communication link between the Metadata API 206 and the adapter 104.

The cache module 306 is configured to store and retrieve abstracted metadata for a particular business object type in a cache 208. As previously discussed, the lookup and reading of metadata for some formats like SDO can be very expensive. Thus, the cache module 306 provides a metadata cache implementation which allows for the caching of metadata in any format to be stored in a generic manner. By caching incoming metadata, the Metadata API 206 can avoid the cost of repeatedly looking up metadata information. Instead, once the lookup of metadata is completed for a particular business object type, the information is stored in the cache 208 for quick access at a later time. Then, when the same business object type metadata is needed again, the Metadata API 206 can access the cache 208 rather than looking up the metadata a second time.

In one embodiment, the cache 208 may be limited by a predefined size limit. At adapter runtime, it is often very likely that there will be frequent requests/events involving certain business object types while there are other business object types that will be rarely invoked. For example, a business type 'Order' within an EIS system 100 may be the type on which multiple transactions run every day, whereas the 'Product' type may be an object type which is invoked only occasionally. Therefore, when the size of the cache 208 reaches the predefined size limit, the cache module 306 may utilize a Least Frequently Used (LFU) algorithm to discard the least frequently used business object type from the cache 208. For instance, the cache 208 or cache module 306 may utilize a counter for counting the number of times each particular business object type has been referenced in the cache 208. Then, when a new business object type that causes the cache to exceed the predefined size limit is processed, the least used business object type found within the cache 208 may be discarded. Thus, the most commonly used business object types will remain available for quick access in the cache 208 and the least commonly used business object types will be discarded.

In one embodiment, each data format specific implementation of the Metadata API 206 instantiates a hashmap instance and uses it to cache metadata using the type of business object as the key. This allows for improved performance, because at runtime, there may be multiple instances of a given type of business object existing and any calls to retrieve the metadata of these business objects will reuse the metadata objects from the cache 208.

Preferably, the object level metadata cache is structured as a map of maps where each cache entry is a map containing the metadata entries for a given business object type. Similarly, property level metadata is preferably structured as a map of maps where each cache entry in the cache 208 is a map containing the metadata entries for a given property type.

Figure 4:
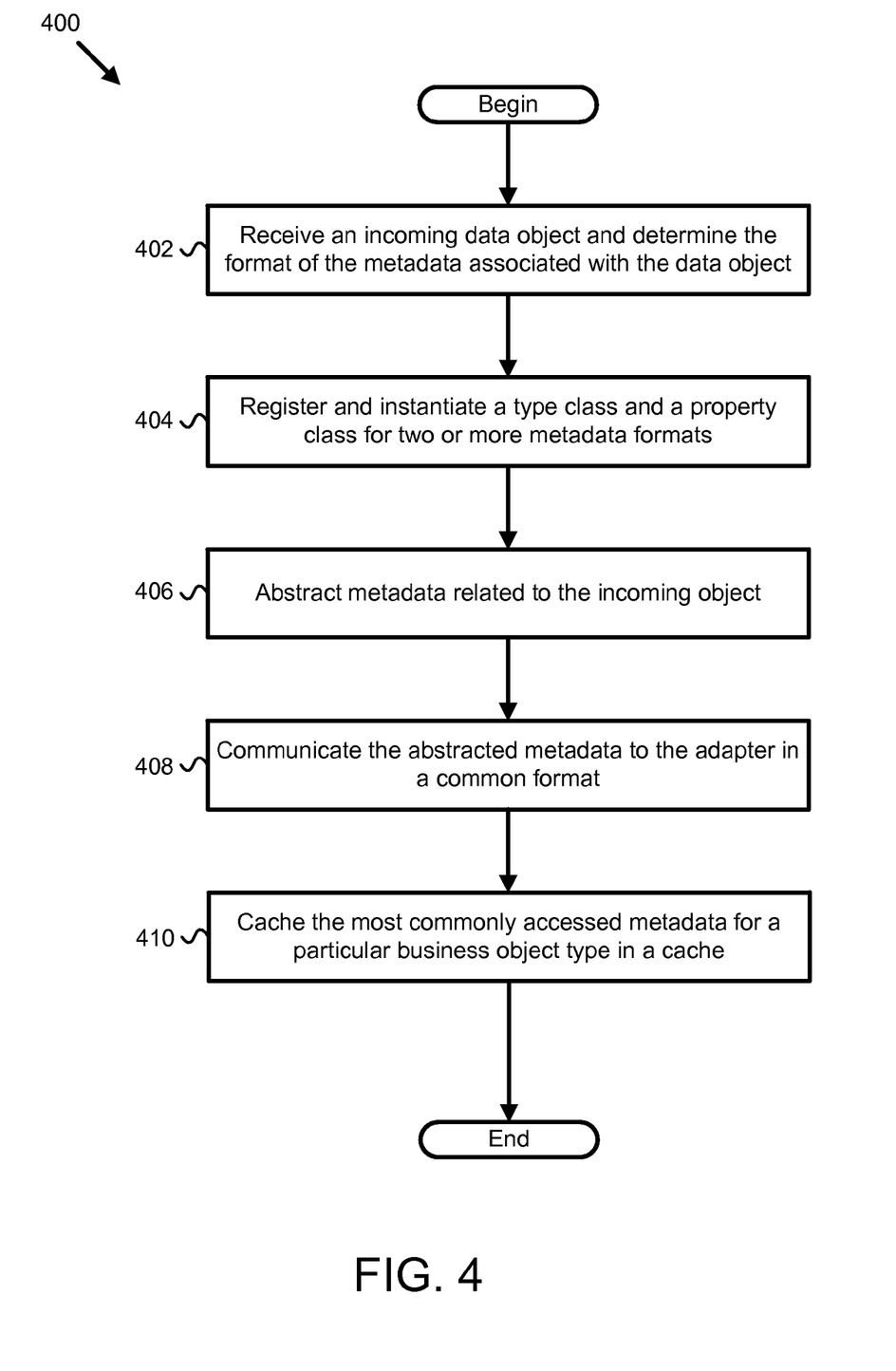
FIG. 4 is a schematic flow chart diagram illustrating one embodiment of a method for providing seamless multiple format metadata abstraction in accordance with the present invention.

FIG. 4 is a schematic flow chart diagram illustrating one embodiment of a method 400 for providing seamless multiple format metadata abstraction in accordance with the present invention. The method 400 includes substantially the same embodiments and implementations described above with regard to the system 100. The method 400 begins when a business object is received 402 by an adapter 104 from a client 106. The adapter 104 utilizes a Metadata API 206 to determine 402 the format of the metadata associated with the incoming business object. The format may include data formats such as SDO, JavaBean, or an application specific metadata representation.

The Metadata API 206 registers and instantiates 404 a type class and a property class for the incoming metadata format. The Metadata API 206 is configured, in at least one embodiment, to operate on two or more different metadata formats. The type class is configured to convert type metadata from the original metadata format to a common metadata format and the property class is configured to do the same with regard to property metadata. Type and property interfaces may also be provided for accessing object-level metadata and property-level metadata respectively.

Next, the abstraction module 302 abstracts 406 relevant metadata, such as ASI, into a common format from the incoming business object wherein the common format is usable by the adapter 104. The Metadata API 206 communicates 408 the abstracted metadata to the adapter 104 in the common format so that processing of the incoming business object may occur based on the abstracted metadata and independent of the original format of the metadata.

Finally, the abstracted metadata may be cached 410 in a cache 208 for later use by the Metadata API 206. The cache 208 may utilize a Least Frequently Used algorithm to discard rarely used items and to make available the most commonly used items for quick access. The method 400 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to provide seamless multiple format metadata abstraction, the system comprising:
    an enterprise information system (EIS) comprising a first processor and a first memory;
    a client comprising a second processor and a second memory;
    an adapter in electronic communication with the EIS and in electronic communication with the client, the adapter comprising:
        a metadata application programming interface (API) operating on two or more different metadata formats, the metadata API comprising:
            an abstraction module configured to register and instantiate a type class and a property class for the two or more different metadata formats, the type class configured to convert type metadata from an original format of first metadata to a common metadata format and the property class configured to convert property metadata from the original format into the common metadata format in accordance with the metadata API and convert first metadata of an incoming object and additional metadata from an annotation map contained by the first metadata into the common format useable by the adapter, wherein the additional metadata is not part of the original format of the first metadata, the two or more different metadata formats further comprise an application specific metadata representation format, the type metadata comprises a type name, property iterations, property lists, property objects, annotations, operation-specific object metadata, and key properties and the property metadata comprises a property containing type, a default property value, a property name, a property class, a property containment, a max length of the property, annotations for the property, and property key information; and
        a communication module configured to communicate the converted metadata to the adapter in the common format, the adapter processing the first metadata and the additional metadata independent of the original format of the first metadata.

2. The system of claim 1, wherein the abstraction module comprises a type module, the type module configured to provide a type interface for seamlessly retrieving object-level metadata in the common format regardless of the original format of the first metadata.

3. The system of claim 1, wherein the abstraction module comprises a property module, the property module configured to provide a property interface for seamlessly retrieving the property metadata in the common format regardless of the original format of the first metadata.

4. The system of claim 1, wherein the metadata API further comprises a cache module configured to store and retrieve abstracted metadata for a particular business object type in a cache.

5. The system of claim 4, wherein the cache has a predefined maximum size limit and wherein the cache has a counter for counting the number of times each particular business object type is referenced within the cache.

6. The system of claim 5, wherein the cache discards a least frequently used business object type stored in the cache based on a number of times each particular business object type has been referenced in the cache and in response to caching a new business object type that causes the cache to exceed the predefined maximum size limit.

7. The system of claim 1, wherein the two or more different metadata formats comprise a Service Data Object (SDO) format and a JAVABEANS® format.

8. A computer program product comprising a non-transitory computer readable medium having computer usable program code executable to perform operations to provide seamless multiple format metadata abstraction by an adapter in communication with an enterprise information system (EIS), the computer program product comprising:
a metadata application programming interface (API) operating on two or more different metadata formats, the metadata API comprising:
an abstraction module configured to register and instantiate a type class and a property class for the two or more different metadata formats, the type class configured to convert type metadata from an original format of first metadata to a common metadata format and the property class configured to convert property metadata from the original format into the common metadata format in accordance with the metadata API and convert first metadata of an incoming object and additional metadata from an annotation map contained by the first metadata into the common format useable by the adapter, wherein the additional metadata is not part of the original format of the first metadata, the two or more different metadata formats further comprise an application specific metadata representation format, the type metadata comprises a type name, property iterations, property lists, property objects, annotations, operation-specific object metadata, and key properties, and the property metadata comprises a property containing type, a default property value, a property name, a property class, a property containment, a max length of the property, annotations for the property, and property key information; and
a communication module configured to communicate the converted metadata to the metadata API in the common format, the metadata API processing the first metadata and the additional metadata independent of the original format of the first metadata.

9. The computer program product of claim 8, wherein the abstraction module comprises a type module, the type module configured to provide a type interface for seamlessly retrieving object-level metadata in the common format regardless of the original format of the first metadata.

10. The computer program product of claim 8, wherein the abstraction module comprises a property module, the property module configured to provide a property interface for seamlessly retrieving the property metadata in the common format regardless of the original format of the first metadata.

11. The computer program product of claim 8, wherein the metadata API further comprises a cache module configured to store and retrieve abstracted metadata for a particular business object type in a cache.

12. The computer program product of claim 11, wherein the cache has a predefined maximum size limit and wherein the cache has a counter for counting the number of times each particular business object type is referenced within the cache.

13. The computer program product of claim 12, wherein the cache discards a least frequently used business object type stored in the cache based on a number of times each particular business object type has been referenced in the cache and in response to caching a new business object type that causes the cache to exceed the predefined maximum size limit.

14. The computer program product of claim 8, wherein the two or more different metadata formats comprise a Service Data Object (SDO) format and a JAVABEANS® format.

15. A method to provide seamless multiple format metadata abstraction by an adapter in communication with an enterprise information system (EIS) performed by a storage device storing executable code, the method comprising:
registering and instantiating a type class and a property class for the two or more different metadata formats, the type class configured to convert type metadata from an original format of first metadata to a common metadata format and the property class configured to convert property metadata from the original format into the common metadata format in accordance with a metadata application programming interface (API);
converting, with the metadata API, first metadata of an incoming object and additional metadata from an annotation map contained by the first metadata into the common format useable by the adapter, wherein the additional metadata is not part of the original format of the first metadata, the metadata API operating on the two or more different metadata formats, the two or more different metadata formats further comprising an application specific metadata representation format, the type metadata comprise a type name, property iterations, property lists, property objects, annotations, operation-specific object metadata, and key properties, and the property metadata comprise a property containing type, a default property value, a property name, a property class, a property containment, a max length of the property, annotations for the property, and property key information; and
communicating the converted metadata to the metadata API in the common format, the metadata API processing the first metadata and the additional metadata independent of the original format of the first metadata.

16. The method of claim 15, the method further comprising providing a type interface for seamlessly retrieving object-level metadata in the common format regardless of the original format of the first metadata.

17. The method of claim 15, the method further comprising providing a property interface for seamlessly retrieving the property metadata in the common format regardless of the original format of the first metadata.

18. The method of claim 15, the method further comprising storing and retrieving abstracted metadata for a particular business object type in a cache.

19. The method of claim 18, wherein the cache has a predefined maximum size limit and wherein the cache has a counter for counting the number of times each particular business object type is referenced within the cache.

20. The method of claim 19, wherein the cache discards a least frequently used business object type stored in the cache based on a number of times each particular business object type has been referenced in the cache and in response to caching a new business object type that causes the cache to exceed the predefined maximum size limit.

21. The method of claim 15, wherein the two or more different metadata formats comprise Service Data Object (SDO) format and JAVABEANS® format.

* * * * *